United States Patent
Roeckl et al.

(10) Patent No.: US 9,616,804 B2
(45) Date of Patent: Apr. 11, 2017

(54) METHOD FOR ADJUSTING THE LIGHTING RANGE OF A VEHICLE HEADLAMP

(71) Applicant: GM GLOBAL TECHNOLOGY OPERATIONS LLC, Detroit, MI (US)

(72) Inventors: Philipp Roeckl, Aschaffenburg (DE); Frank Langkabel, Ruesselsheim (DE); Ingolf Schneider, Ruesselsheim (DE); Thomas Feid, Mannheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 171 days.

(21) Appl. No.: 14/195,429

(22) Filed: Mar. 3, 2014

(65) Prior Publication Data

US 2014/0247613 A1     Sep. 4, 2014

(30) Foreign Application Priority Data

Mar. 1, 2013   (DE) .................. 10 2013 003 459

(51) Int. Cl.
| | |
|---|---|
| *B60Q 1/00* | (2006.01) |
| *B60Q 1/08* | (2006.01) |
| *B60Q 1/10* | (2006.01) |
| *G06T 7/00* | (2017.01) |

(52) U.S. Cl.
CPC ............... *B60Q 1/08* (2013.01); *B60Q 1/10* (2013.01); *G06T 7/004* (2013.01); *B60Q 2300/132* (2013.01); *B60Q 2300/30* (2013.01); *G06T 2207/30252* (2013.01)

(58) Field of Classification Search
CPC ...... B60Q 1/08; B60Q 1/10; B60Q 2300/132; B60Q 2300/30

USPC .......................................................... 362/466
See application file for complete search history.

(56) References Cited

U.S. PATENT DOCUMENTS

| | | | | | |
|---|---|---|---|---|---|
| 4,781,465 | A | * | 11/1988 | Demachi ............ | B60G 17/0165 356/3.07 |
| 5,193,894 | A | * | 3/1993 | Lietar ................. | B60Q 1/10 362/276 |
| 5,562,336 | A | * | 10/1996 | Gotou .................. | B60Q 1/085 362/276 |
| 6,130,506 | A | * | 10/2000 | Lopez ................. | B60Q 1/0023 307/10.8 |
| 6,144,159 | A | * | 11/2000 | Lopez ................. | B60Q 1/0023 315/82 |

(Continued)

FOREIGN PATENT DOCUMENTS

| | | |
|---|---|---|
| DE | 102009047932 A1 | 4/2011 |
| DE | 102011017697 A1 | 10/2012 |
| DE | 102011081392 A1 | 2/2013 |

*Primary Examiner* — Robert May
*Assistant Examiner* — Tsion Tumebo
(74) *Attorney, Agent, or Firm* — Lorenz & Kopf, LLP

(57) ABSTRACT

A method for adjusting the lighting range of a headlamp in a motor vehicle, is performed with the following steps. A first coordinateis acquired that corresponds to a position of the motor vehicle. At least one image of a camera connected with the motor vehicle is evaluated so as to acquire a second coordinate that corresponds to the position of an object on a roadway in the zone ahead of the motor vehicle. A reference angle is calculated for the motor vehicle from the first coordinate, the second coordinate and a height of the camera over the roadway. The lighting range of the headlamp is adjusted based on the reference angle.

8 Claims, 2 Drawing Sheets

(56) References Cited

U.S. PATENT DOCUMENTS

| | | | |
|---|---|---|---|
| 6,321,159 B1* | 11/2001 | Nohtomi | B62D 1/28 340/903 |
| 6,343,869 B1* | 2/2002 | Kobayashi | B60Q 1/085 315/77 |
| 6,373,378 B1* | 4/2002 | Ewerhart | B60Q 1/085 340/425.5 |
| 6,709,135 B2* | 3/2004 | Couillaud | B60Q 1/0023 362/428 |
| 2002/0080618 A1* | 6/2002 | Kobayashi | B60Q 1/085 362/466 |
| 2010/0309674 A1* | 12/2010 | Su | B60G 17/01908 362/466 |

* cited by examiner

METHOD FOR ADJUSTING THE LIGHTING RANGE OF A VEHICLE HEADLAMP

CROSS REFERENCE TO RELATED APPLICATION

This application claims priority to German Patent Application No. 102013003459.0, filed Mar. 1, 2013, which is incorporated herein by reference in its entirety.

TECHNICAL FIELD

The invention relates to a method for adjusting the lighting range of a vehicle headlamp, in particular for a vehicle headlamp in a motor vehicle.

BACKGROUND

Known from general prior art are systems for adjusting the lighting range of a vehicle headlamp, which are fully automated in design. The level sensors, also referred to as axis sensors, are here connected at each axis with a control unit, so as to determine a change in the vehicle inclination, and compensate accordingly with a modified setting of the headlamps.

Known from DE 10 2009 047 932 A1 is a headlamp for a motor vehicle, in which a device is provided for the basic setting of headlamps. If the headlamps are made operational, an image capture camera can be used to detect the position of a light axis and compare it with the prescribed position of the light axis. This target/actual comparison enables a readjustment with the device, so that the light axis corresponds with the prescribed light axis. Provided for this purpose is a distance sensor, which detects the distance between the motor vehicle and an imaging surface.

SUMMARY

The present disclosure provides a method for adjusting the lighting range of a headlamp in a motor vehicle. A first coordinate corresponding to a position of the motor vehicle is acquired. At least one image from a camera connected with the motor vehicle is then evaluated, so as to acquire a second coordinate that corresponds to the position of an object on a roadway in the zone ahead of the motor vehicle. In addition, a reference angle of the motor vehicle is calculated from the first coordinate, the second coordinate and a height of the camera over the roadway. The lighting range of the headlamp is adjusted based on the reference angle.

Determined accordingly is a reference angle for the motor vehicle, which is drawn upon for adjusting the lighting range of the headlamp. It is here not necessary to detect the light beam emitted by the headlamps, since the reference angle of the motor vehicle acts as an inclination indicator. As a consequence, the method can also be implemented even when the headlamps are not in operation, since no light axes or the like have to be detected. In addition, the method can be used while driving, thereby at least partially eliminating the delay often encountered in automatic lighting range adjustments due to the readout of the level sensor. This delay stems from the fact that the level sensors are often not read while driving, so that any change in the motor vehicle load that might prompt an adjustment of the lighting range is only detected after the vehicle has been restarted. By contrast, the invention enables a continuous adjustment of the lighting range. Since the reference angle changes while loading and unloading due to the different body inclination, the lighting range can be easily adjusted.

In one embodiment, the first coordinate is acquired with a satellite-assisted navigation system, preferably a GPS, Galileo, Compass or GLONASS receiving system.

The method disclosed herein is used to determine the reference angle based on the first coordinate, second coordinate and installed height of the camera. While the installed height is set after mounting the camera and no longer changes, the current position of the motor vehicle must be determined so that the reference angle can be calculated. A satellite-assisted navigation can be used for this purpose, which today is usually provided as a GPS receiving system. The future European system can also be used, as can the Chinese and Russian systems. In another embodiment, the object on the roadway is a lane marking, preferably a stop line or an arrangement of markings to control distance. According to this embodiment, the object on the roadway takes the form of a stop line or arrangement of markings to control distance, such as those often encountered on highways, for example before bridges. The object on the roadway is acquired by the camera, so that a second coordinate apart from the first coordinate can be established if the position of the object on the roadway is known. In conjunction with the known height of the camera, the reference angle is determined in this way.

In another embodiment, the second coordinate is determined via the satellite-assisted navigation system, a digital roadmap, or a database. For example, the object on the roadway can be noted on a digital roadmap or stored in a database. It is likewise possible to acquire the object with the satellite-assisted navigation system. To this end, for example, the position of the motor vehicle is acquired once it comes to a stop in front of the stop line or rolls over the latter.

In another embodiment, the steps are repeatedly performed, wherein several or all previously calculated reference angles are averaged to determine deviations from a target value. According to this embodiment, the headlamp lighting range is continuously calibrated via the camera system, thereby yielding a fully automated and continuous lighting range adjustment.

In another embodiment, the step of calculating the reference angle takes place by triangulation. Also referred to as triangular integration, triangulation is a method used in optical measuring technology to measure distance with light, proceeding from the motor vehicle position, line position and camera height as the sampling points. This makes it possible to easily detect a change in the inclination of the motor vehicle, wherein the change is manifested in a modified reference angle that is drawn upon as a control variable for lighting range adjustment.

In another embodiment, the step of adjusting the lighting range for the headlamp based on the reference angle is performed in addition to using a signal of an axial sensor. Axial sensors or inclination sensors are often used for automatic lighting range adjustment. Both approaches can be combined in this embodiment, thereby yielding an overall robust method for lighting range adjustment.

The described method along with the advantageous embodiments can be provided in a motor vehicle, in particular in a control unit for adjusting the lighting range of a headlamp.

The control unit can have a digital microprocessor unit (CPU) linked in terms of data with a storage system and bus system, a working memory (RAM) and a storage medium.

The CPU is designed to process commands executed as a program residing in a storage system, acquire input signals from the data bus, and release output signals to the data bus. The storage system can have various storage media, such as optical, magnetic, solid state and other nonvolatile media, on which is stored a corresponding computer program for implementing the method along with the advantageous embodiments. The program can be configured so as to be able to embody or implement the methods described herein, so that the CPU can execute the steps involved in such methods, and the motor vehicle can thus control the headlamp(s).

Suitable for implementing a method is a computer program that exhibits program code means, so as to perform all steps in any one of the claims when running the program on a computer. Simple means can be used to load and use the computer program in already existing control units so as to adjust the lighting range of a headlamp. Provided to this end is a computer program product with program code means, which are stored on a computer-readable data storage medium to implement the method according to each one of the claims when running the program product on a computer. The computer program product can also be integrated into control units as a retrofitting option.

Another aspect of the invention relates to an apparatus for adjusting the lighting range of a headlamp in a motor vehicle which includes means for acquiring a first coordinate that corresponds to a position of the motor vehicle; means for evaluating at least one image of a camera connected with the motor vehicle, so as to acquire a second coordinate that corresponds to a position of an object on a roadway in front of the motor vehicle; means for calculating a reference angle for the motor vehicle from the first coordinate, the second coordinate and a height of the camera over the roadway; and means for adjusting the lighting range of the headlamp based on the reference angle.

In one embodiment of the apparatus, the means for acquiring a first coordinate may be a satellite-assisted navigation system, preferably a GPS, Galileo, Compass or GLONASS receiving system. In another embodiment of the apparatus, the object on the roadway is a lane marking, preferably a stop line or arrangement of markings for distance control. In another embodiment of the apparatus, means for determine the second coordinate is determined with the satellite-assisted navigation system, a digital roadmap, or a database.

In another embodiment of the apparatus, the steps are repeatedly performed, wherein several or all previously calculated reference angles are averaged to determine deviations from a target value. In another embodiment of the apparatus, the means for determining the reference angle are designed so that a determination can take place via triangulation. In another embodiment of the apparatus, the means for adjusting the lighting range of the headlamp based on the reference angle are designed so that this can be done in addition to using a signal of an axial sensor.

BRIEF DESCRIPTION OF THE DRAWINGS

The various embodiments will herein after be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
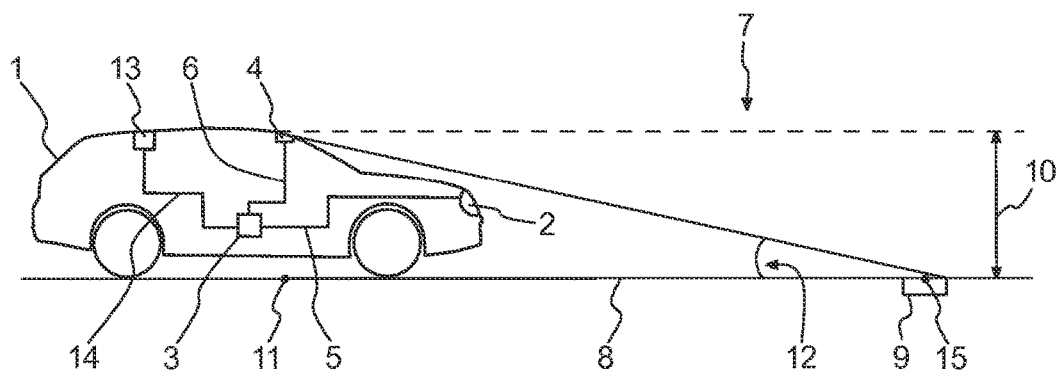
FIG. 1: is a side view of a motor vehicle during implementation of the method according to the invention.

FIG. 1 presents a schematic side view of a motor vehicle 1. The motor vehicle 1 is equipped with headlamps 2 and a control unit 3 for regulating the lighting range of the headlamps 2, which communicates with the headlamps 2 via a first connection 5. A second connection 6 links the control unit 3 with a camera system 4 linked in terms of data transmission. In particular a zone ahead 7 of the motor vehicle 1 can be acquired via the camera system 4 and processed in the control unit 3 in a manner not depicted. In particular, objects located on a roadway 8 can be discerned in the zone ahead 7.

The object 9 located on the roadway 8 is a lane marking, for example a stop line or an arrangement of markings for distance control, of the kind often applied to highways before bridges.

The motor vehicle 1 is further equipped with a satellite-assisted navigation system 13, which can operate as a GPS, Galileo, Compass or GLONASS receiving system. The satellite-assisted navigation system 13 is also linked in terms of data transmission with the control unit 3 by way of a third connection 14.

The satellite-assisted navigation system 13 acquires a first coordinate 11, which corresponds to the position of the motor vehicle 1. As shown on FIG. 1, the first coordinate 11 can be defined in an imagined perpendicular line under the camera 4.

In addition, the camera 4 exhibits a height 10 above the roadway 8 corresponding to the installed height of the camera 4 in the motor vehicle 1.

By evaluating an image of the camera 2 connected with the motor vehicle 1, a second coordinate 15 is acquired that corresponds to the position of the object 9 on the roadway 8 in the zone ahead 7 of the motor vehicle 1. For example, this position is determined via the satellite-assisted navigation system 13, a digital roadmap, or a database.

As evident from FIG. 1, a right triangle is obtained between points 4, 11 and 15, now making it possible to calculate a reference angle 12 for the motor vehicle from the first coordinate 11, the second coordinate 15 at the location of the object 9, and the height 10 of the camera 4 above the roadway 8, given a known distance for 11-15. The reference angle 12 is calculated via triangulation. This reference angle 12 can be drawn upon for adjusting the lighting range of the headlamp 2.

Figure 2:
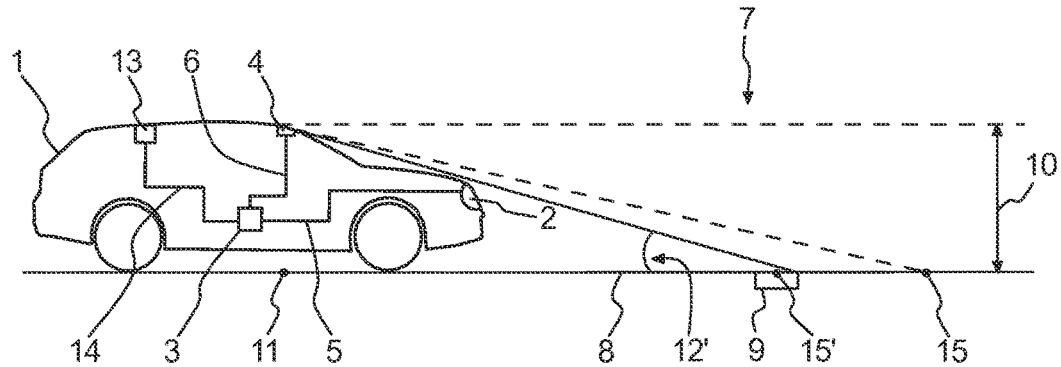
FIG. 2: is another side view of a motor vehicle during implementation of the method according to the invention.

If the inclination of the motor vehicle 1 is now slightly changed as depicted on FIG. 2, the right triangle also changes between points 4, 11 and 15. For example, if the load on the rear axis of a motor vehicle 1 is relieved when one or more rear passengers get out, the reference angle 12' decreases. Expressed differently, the distance between the motor vehicle 1 and object 9 becomes smaller given an otherwise unchanged geometry, as denoted on FIG. 2 by the road marking as the second coordinate 15'. By comparing the new reference angle 12' (actual value) with the previously calculated reference angle 12 (target value), the lighting range of the headlamps 2 can now be adjusted via the controller 3.

Figure 3:
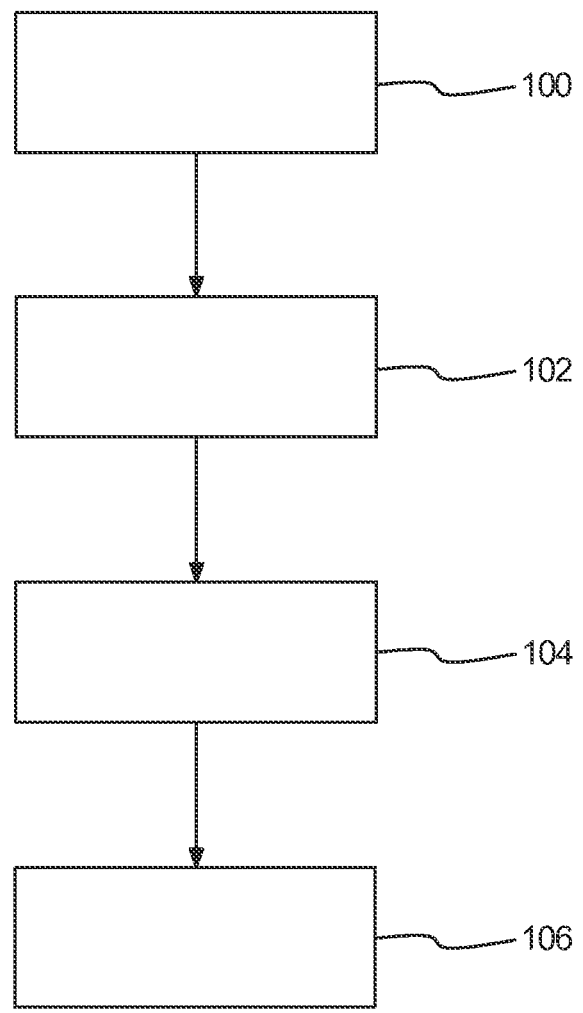
FIG. 3: are steps of the method according to the invention in a flowchart.

FIG. 3 presents a schematic view depicting the course of the procedure, which can be implemented in the control unit 3 of the motor vehicle 1.

A first coordinate 11 corresponding to a position of the motor vehicle 1 is acquired in step 100. At least one image of a camera 4 connected with the motor vehicle 1 is evaluated in step 102, so as to acquire a second coordinate that corresponds to the position of an object 9 on a roadway 8 in the zone ahead of the motor vehicle 1. In step 104, a reference angle 12 for the motor vehicle 1 is calculated from the first coordinate, the second coordinate and a height 10 of the camera 4 over the roadway 8. The lighting range of the headlamp 2 is adjusted in step 106 based on the reference angle 12.

Steps 100 to 106 can be repeatedly performed, wherein several or all previously calculated reference angles 12 and 12' are averaged to determine deviations from the target value.

The described method according to steps 100 to 106 can also be implemented in addition to the signal from an axial sensor.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for adjusting the lighting range of a headlamp in a motor vehicle comprising:
   acquiring first coordinate data that corresponds to a position of a motor vehicle;
   evaluating image data from a camera connected with the motor vehicle, so as to acquire second coordinate data that corresponds to the position of an object on a roadway in the zone ahead of the motor vehicle;
   calculating a reference angle for the motor vehicle from the first coordinate, the second coordinate and an installed height of the camera above the roadway; and
   adjusting a lighting range of a headlamp on the motor vehicle based on the reference angle, wherein
   calculating the reference angle is performed via triangulation.

2. The method according to claim 1, wherein the object on the roadway is a lane marking.

3. The method according to claim 2, wherein the lane marking comprise a stop line or an arrangement of markings for distance control.

4. The method according to claim 1, wherein the first coordinate data is acquired with a satellite-assisted navigation system.

5. The method according to claim 4, wherein the satellite-assisted navigation system is selected from the group consisting of a GPS, Galileo, Compass or GLONASS receiving system.

6. The method according to claim 4, wherein the second coordinate data is determined via the satellite-assisted navigation system, a digital roadmap, or a database.

7. The method according to claim 1, further comprising:
   repeatedly acquiring first and second coordinate data and calculating reference angles therefrom to form a set of reference angles;
   calculating an average reference angle from the set of reference angles; and
   determining a deviation of a target valve from the average reference angle.

8. The method according to claim 1, wherein adjusting the lighting range of the headlamp based on a reference angle is performed in addition to using a signal of an axial sensor.

* * * * *